United States Patent [19]

Astley et al.

[11] Patent Number: 4,577,804
[45] Date of Patent: Mar. 25, 1986

[54] WET GRINDING PHOSPHATE ROCK IN AN ACIDIC SLURRY

[75] Inventors: Vivian C. Astley, New Orleans, La.; Rudolph R. Milan, Albany, Calif.; Jody J. Taravella, Harvey, La.

[73] Assignee: Freeport Minerals Company, New York, N.Y.

[21] Appl. No.: 638,420

[22] Filed: Aug. 7, 1984

[51] Int. Cl.$^4$ .............................................. B02C 23/36
[52] U.S. Cl. ........................................ 241/16; 241/21; 241/30; 423/167; 423/320
[58] Field of Search ...................... 241/15, 16, 21, 30; 423/167, 319, 320

[56] References Cited

U.S. PATENT DOCUMENTS

| | | | |
|---|---|---|---|
| 3,699,212 | 10/1972 | Palm | 423/407 |
| 4,044,107 | 8/1977 | Houghtaling | 423/220 |
| 4,402,923 | 9/1983 | Lang | 423/167 X |

OTHER PUBLICATIONS

An Article, Productions of Wet-Process Phosphoric Acid, by T. P. Hignett.

W. R. Parish and J. V. Galluzzo, "A Concept for Wet Grinding Using Pond Water", May 1981.

*Primary Examiner*—Howard N. Goldberg
*Assistant Examiner*—Timothy V. Eley
*Attorney, Agent, or Firm*—Fisher, Christen & Sabol

[57] ABSTRACT

Phosphate rock contained in an acidic slurry is ground by equipment wherein the acidic slurry contacts the metallic surfaces of the equipment. A method for monitoring and controlling grinding ball consumption is provided in which acid-neutralizing particulate iron contained in the acidic slurry is measured and correlated to control curves, which relate particulate iron concentration to slurry pH and slurry pH to the rate grinding ball consumption. If the measured particulate iron concentration equates to an unacceptable ball corrosion rate, the equilibrium of the slurry pH and particulate iron concentration can be varied to maintain a predictable ball consumption. When making the slurry, waste water from other steps of the wet process manufacture of phosphoric acid can be used as part of an acidic diluting medium.

16 Claims, 3 Drawing Figures

WET PHOSPHORIC ACID PLANT FLOW DIAGRAM

WET GRINDING PHOSPHATE ROCK IN AN ACIDIC SLURRY

BACKGROUND OF THE INVENTION

1. Field Of The Invention

This invention relates to the process for monitoring and controlling the ball consumption rate when wet grinding phosphate rock in an acidic slurry. More particularly, the method of the invention relates to determining and maintaining a level of acid-neutralizing particulate iron in the acidic slurry of phosphate rock sufficient to monitor the consumption rate of grinding balls and to control their consumption rate at a satisfactory, predetermined level. The phosphate rock slurry can be made from an acidic diluting medium obtained from the waste water produced during other steps of the wet process manufacture of phosphoric acid.

2. Description Of The Prior Art

The use of wet grinding of phosphate rock to produce suitable feed for wet process phosphoric acid plants has accelerated in recent years due to the substantial energy savings of wet grinding over dry grinding. An opportunity for additional, substantial cost savings at wet process plants occurs if pond water can be used to replace, completely or in part, the service water presently used in wet grinding operations. The service water used in such operations generally originates from a waterway or reservoir conveniently located to the wet process phosphoric plant. Pond water, or gypsum pond water, as it is sometimes called, originates when waste or by-product gypsum from the attack system of wet process phosphoric acid plants is slurried with water and pumped to large ponds where the gypsum settles out. The composition of the remaining supernatant water or pond water is typically such that the pH is low, often below 2.0. If the pond water can be recycled, substantial treatment costs necessary to meet environmental regulations can also be avoided.

The value of recycling pond water has been recognized in previous patents. U.S. Pat. No. 4,044,107 Houghtaling mentions the possibility of using gypsum pond water in the phosphate rock grinding operation. However, it recommended taking precautions against corrosion, for example, by using a rubber-lined mill and non-corrodible balls. These precautions add to the initial expense of the grinding mill installation and make its periodic maintainance after continued operation more expensive.

Chemical neutralization of acidic pond water was proposed as a way of avoiding corrosion problems of the grinding equipment. Specifically, a proposal by W. R. Parish and J. V. Galluzzo in a paper dated May, 1981, entitled "A Concept for Wet Rock Grinding Using Pond Water—The Lang Process (Liquid Ammonia Neutralization and Grinding)" recommended the use of sodium hydroxide or ammonia to raise the pH of the acidic pond water. Of course, the use of such chemicals increased expenses by the cost of the chemicals, as well as required more equipment and time to effectuate the neutralization.

U.S. Pat. No. 4,402,923 to Land discloses the use of recycled mineral acid waste water effluent from wet process phosphoric acid production in the wet grinding of phosphate rock. Specifically, that patent warns at column 4, line 16, that the pH of the phosphate rock acid water should be at least about 4.0 or 4.6 or higher, and emphasized the various ways to achieve neutralization of the waste water. It was stated that it was preferable to grind at a pH of 5.5 or higher to avoid excessive corrosion of the metal grinding media.

Only when special metals are used, according to the Lang patent, can the acidity of the phosphate rock slurry fall to a pH of 4 or even lower. An example given of a special metal is nickel-chrome steel alloy. The use of grinding balls manufactured from speciality alloys instead of mild steel or iron increases the expense of a wet phosphate rock grinding operation. Mild steels are generally considered steels which are not specially alloyed to increase their strength or resistance to corrosion. Forged steel is an example of a mild steel used in the preferred embodiment of this invention.

The patent to Lang does not disclose an accurate method to predict the rate of grinding ball consumption. The use of acidic pond water will increase ball corrosion. The economic savings of using recycled pond water outweighs, within limits, the increased expense incurred from more rapid ball corrosion. Statistical methods allow a phosphate rock grinding plant's managers to establish the limits wherein the most economical balance is made between these two variables. An accurate method to monitor the rate of corrosion permits a more economical utilization of pond water in wet phosphate rock grinding operations by allowing the mill's operators to remain within the desired balance of these factors.

The erosion and corrosion of mild steel or iron balls used in ball mills for the wet grinding of phosphate rock when pond water is used are well known phenomenon. Erosion is caused by repeated, abrasive contact between balls and phosphate rock. The rate of erosion is not dependent on high acidity being present. Corrosion, on the other hand, is caused by the high acidity of the grinding slurry. The high acidity of the grinding slurry is neutralized to some extent by acid-neutralizing impurities contained in the raw phosphate rock being ground in the ball mills and in the coarse fraction of ground phosphate rock which, in most plants utilizing wet grinding, is recycled from cyclone separators or other types of particle size separators that are present to receive and classify ball mill product. The presence of the acid-neutralizing impurities in phosphate rock is also known in the industry. The neturalizing effects of the phosphate rock impurities, alone, is usually not sufficient to prevent corrosion of the grinding balls.

Iron or steel erosion in ball mills used for wet grinding phosphate rock has been a concern of the industry for some time, due to its expense. The measured erosion rate of the balls is often in the range of 600–2000 mils/yr. The erosion products can sometimes consist of large ball pieces, but more often are present as fine high surface area iron or steel particles, commonly referred to as particulate iron.

Prior to the development of this process, the recycling of acidic waste water from the production of phosphoric acid required, as detailed in the Lang patent, the use of grinding balls made from expensive, corrosion-resistant specialty steels or the pretreatment of the waste water before addition to the grinding slurry to insure a pH to 4 or higher. Without such measures the control of the ball corrosion rate was haphazard. An object of this invention is to avoid these expenses and economically permit the monitoring and control of the ball corrosion rate where acidic pond water is used directly in the phosphate rock grinding slurry of a ball mill, containing iron or mild steel balls. This invention additionally reduces the amount of acidic waste water that requires treatment before release to the general environment.

SUMMARY OF THE INVENTION

This invention involves a means to control the grinding ball consumption rate at or below a predetermined acceptable rate. That rate is monitored and controlled by the particulate iron concentration within the slurry. The particulate iron concentration in the slurry can be maintained by retaining and recycling of endogenous iron particles formed by erosion of the grinding balls or the addition of exogenous iron particles from some other source. The pH of the slurry can be controlled by changing the mixture of pond water and service water used to form the slurry. The pond water in the preferred embodiment is mixed with service water, which is usually of a higher, neutral pH. This invention can also be used to monitor and control ball consumption where pond water is chemically neturalized.

This invention includes a method that provides for economical grinding of phosphate rock in an acidic slurry wherein iron or mild steel balls are used and the acidic diluting medium used to make up the slurry is obtained, in whole or in part, from waste water produced during the other steps of the wet process manufacture of phosphoric acid.

DETAILED DESCRIPTION OF THE INVENTION

Figure 1:
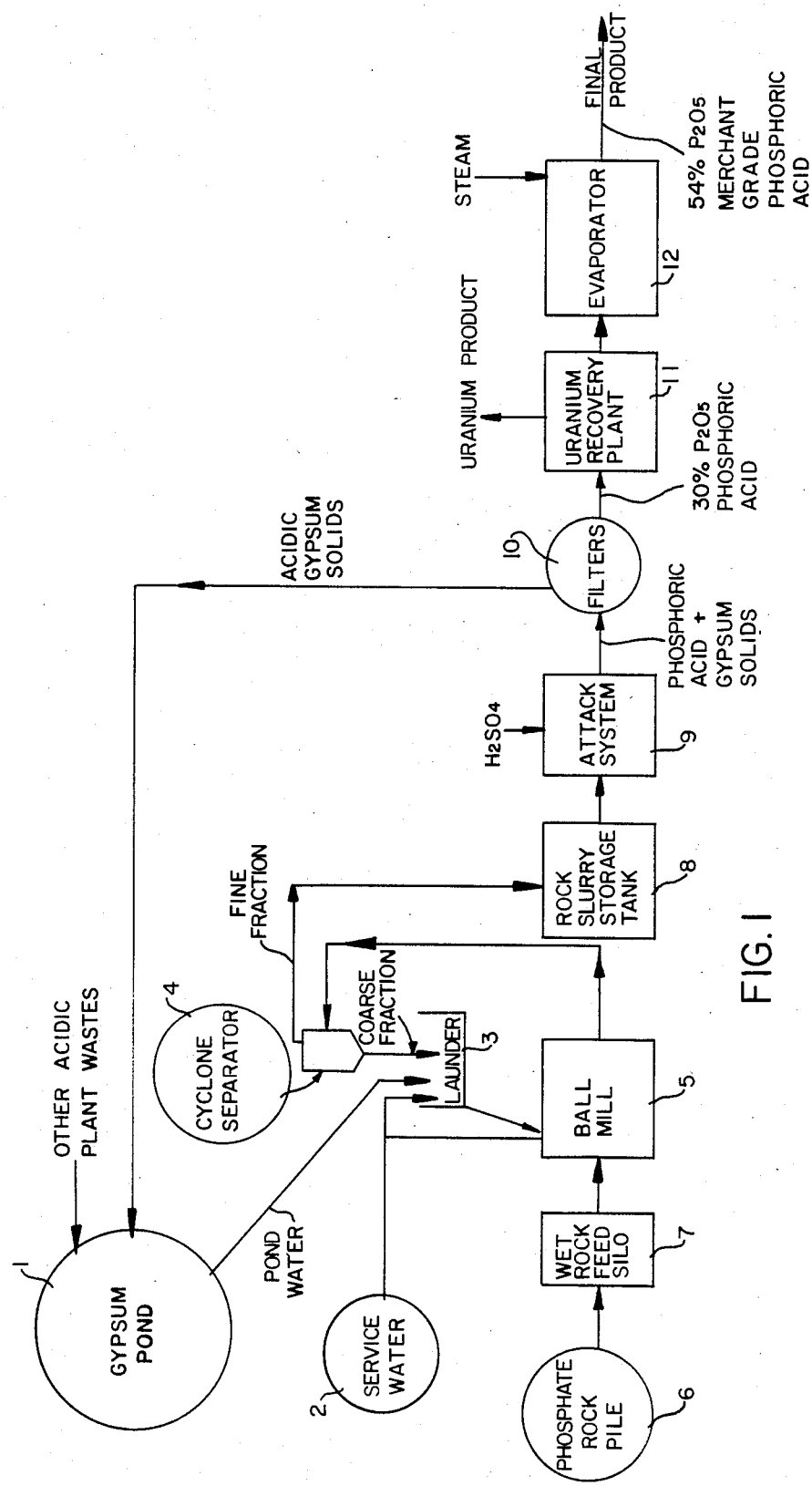
FIG. 1 is a flow diagram of a wet phosphate rock grinding operation.

FIG. 1 illustrates an example of a wet grinding phosphoric acid plant flow diagram. Pond water 1 and service water 2 are combined in a launder 3 and blended. The blended water is fed into the ball mill 5. service water in this example is also added directly to the ball mill 5. The ball mill 5 receives phosphate rock supplied from a wet phosphate rock feed silo 7, which in turn is fed from a phosphate rock pile 6. The ball mill is operated to grind the phosphate rock. The ground rock is fed to a cyclone separator 4 and two fractions are separated. The course fraction containing particulate iron is recycled back to the ball mill 5 via the launder 3. A fine fraction is taken from the separators 4 and fed to a rock slurry storage tank 8. From the storage tank 8 the fraction is pumped to an attack system 9 for reaction with sulfuric acid. In the attack system 9 phosphoric acid and gypsum solids are formed. Separation of the phosphoric acid and gypsum solids occurs in filters 10. A slurry containing the acidic gypsum solids is pumped to the gypsum pond 1. The filtered phosphoric acid undergoes further processing, for example, a uranium recovery step 11. After such processing the phosphoric acid solution is concentrated into a final product in evaporators 12.

Particulate iron is produced from grinding ball erosion in the ball mill 5. The particulate iron is from iron or steel grinding balls used in the mill and is an excellent acid-neutralizing agent. Additionally, the control of the level of particulate iron contained in the acidic slurry can be used in conjunction with slurry pH measurements to control that part of ball consumption rate due to corrosion. The large surface area of the particulate iron enables the chemical reaction between the iron and phosphoric acid of the pond water or pond water and service water blend to occur at a rate sufficient to neturalize enough acid in the slurry to raise the pH noticeably. Additionally, at least a portion of particulate iron not reacted immediately in the ball mill can, because of its high specific gravity, be separated and recycled with the oversized phosphate rock from cyclone separator 4. Thus ample time is provided for the chemical reaction of iron and acid to take place.

Figure 2:
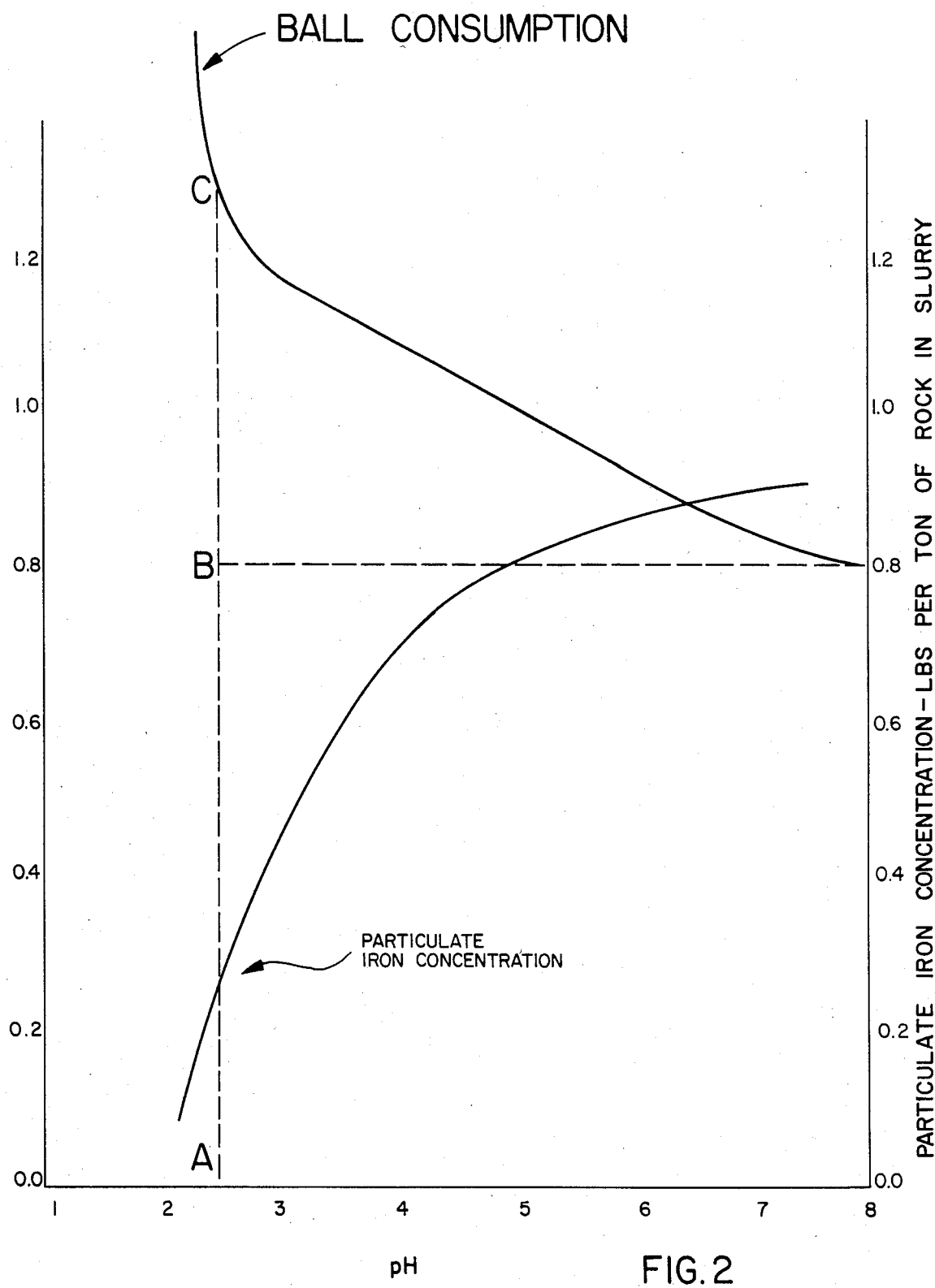
FIG. 2 is an example of a graph equating the ball consumption rate, expressed as pounds of grinding ball metal lost per ton of phosphate rock ground, to particulate iron concentration of the slurry by plotting each in relation to the pH of the slurry.

FIG. 2 further illustrates the invention. In this figure the ball consumption rate, expressed as pounds of grinding ball metal lost per ton of phosphate rock ground, of a typical acidic slurry of a phosphate rock grinding mill, is plotted against the pH of the slurry. The particulate iron concentration, expressed as pounds of iron per ton of phosphate rock in the slurry, is also plotted against the pH of the slurry. Data for control curves of this type can be obtained from laboratory or pilot plant experiments outlined in the examples to follow below.

The control curves of FIG. 2 are obtained by varying the operating acid level or pH in the slurry of a ball mill. The ball mill used to derive this curve can be a full scale plant, a pilot plant, or a laboratory mill. In the smaller ball mills silicon carbide can be added (see Example I) to more closely simulate the grinding rates of a full scale plant. The type and grade of iron containing balls and phosphate rock to be used in the mill are to remain constant. The mill is operated at the selected pH value until the system equilibrates. The iron particulate concentration is then determined for this pH value. This procedure is repeated for other pH values. Preferably the pH values tested range between 1 to 8 or from the pH of the pond water to the pH of the service water. The values of pH to particulate iron concentration are plotted and a curve is drawn.

Simultaneously with the plotting of pH to particulate iron concentration is the plotting of grinding ball consumption to pH. Grinding ball consumption for each operating pH value is determined by (1) marking a number of the balls and averaging their wear during an operating period or (2) measuring the amount of drop in the level of grinding balls contained in the test mill. The ball drop method can be stated conversely as the weight of the balls added to the mill after an operating period which returns the ball level to its original level. A mill operating period of several weeks can be required to achieve a measurable ball corrosion.

As the pH of the slurry is decreased, the rate of corrosion, which is excessive for economical mill operation, is eventually reached. Periodic adjustments to the curves to compensate for changes in the type of balls used or the phosphate rock ground, are usually necessary only within the mill's established operating pH range. If the curves are determined by a laboratory model or pilot plant, samples of the operating plant's values are compared with the pilot plant or laboratory values to ensure the accuracy of the smaller scale curves.

In FIG. 2, line segment A-C represents the total ball consumption rate. Total ball consumption rate is the sum of two values. The first value is ball consumption due to erosion represented in FIG. 2 by line segment A-B. The second value is ball consumption due to corrosion represented in FIG. 2 by line segment B-C. This invention is related to controlling that part of the rate of ball consumption that is due to corrosion (segment B-C). The variable relationships plotted in FIG. 2 are typical of the relationship found between ball consumption rate, particulate iron concentrations, and pH.

Control of the acidic slurry pH and particulate iron concentration, and hence that part of ball consumption due to corrosion, is accomplished in part by adjusting the ratio of pond water to service water contained in the blend of the two waters. This blend is the aqueous phase of the acidic grinding slurry. The pond water with its high acidity (i.e. pH<2) can be blended with the service water which is approximately neutral (i.e. pH 7 to 8) to produce blends of water with pH values ranging from <2 to 8. When relatively small amounts of pond water are used in the blend (i.e. at blend pH levels of between about 4 and 7) the slurry is low enough in acidity that the tendency for corrosion is low and ball consumption in this pH range increases only slightly. Particulate iron concentrations in the slurry decline only moderately as the pH drops from approximately 7 to approximately 4. As the ratio of pond water to service water in the slurry increases and the pH drops below about 4, the role of corrosion in ball consumption becomes more pronounced and the ball consumption rate begins to increase at an accelerated rate. Particulate iron levels in the slurry drop as the fine, high-surface-area particulate iron reacts with an increasing amount of acid. At pH levels below about 2.0 to 2.5, about 90% of the original particulate iron has been consumed and ball consumption becomes excessive for most operations.

Figure 3:
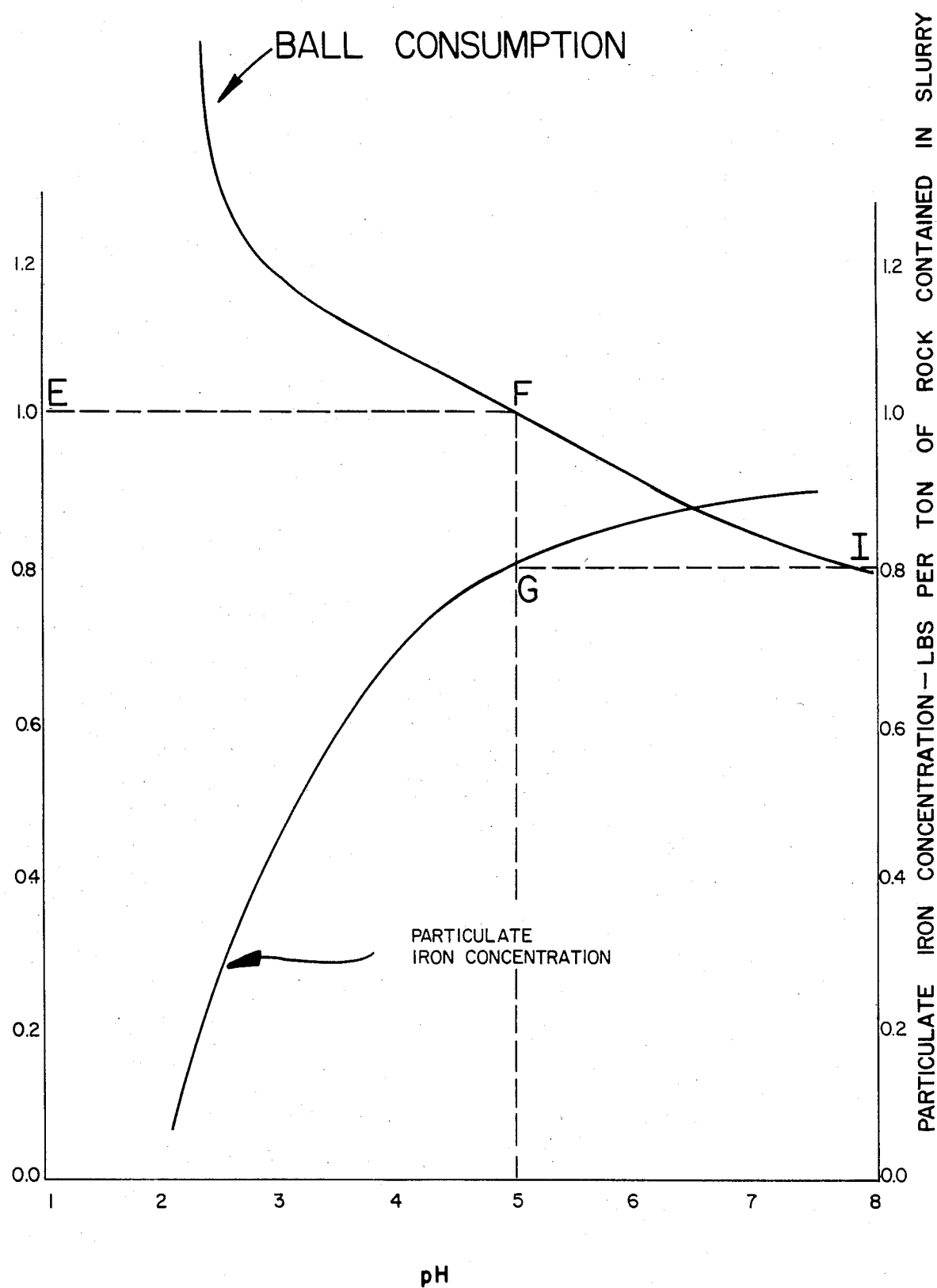
FIG. 3 is an illustration of the use of the graphic example of FIG. 2 to predetermine the particulate iron concentration and slurry pH required to control the rate of grinding ball consumption.

To use our invented method in industry, a control curve, such as that shown in FIG. 3, is established by means of laboratory, pilot plant, or full scale plant testing. Determination of the desired ball consumption rate is made by establishing a rate at which the economic loss due to ball consumption is outweighed by the economic savings obtained from the use of a quantity of acidic pond water. This ball consumption rate (point E) will herein be referred to as the control point. By drawing line segments E-F, F-H, G-H, and G-I, the control point is corresponded to values of a slurry pH (point H) and a slurry particulate iron concentration (point I). By equilibrating and maintaining these values for pH and particulate iron concentration within the slurry, the ball consumption rate is stabilized at the control point. In industrial operations the blend of pond and service waters and the recycled particulate iron concentration can be monitored, compared, and regulated manually or by a control means involving sensors, a computer monitoring device, and computer signaled control drives.

Once the control point is established, the pond water and service water ratio or blend is adjusted to bring the acidic slurry to the control point pH on the control curves. Once the control point pH is reached, tests of particulate iron concentrations in the slurry are begun. Adjustments to the pond water and service water ratio continue, if necessary, until the control point particulate iron concentrations range on the control curves is reached and the system has equilibrated. In summary, the approximate control point is reached using pH and this is followed by use of particulate iron measurements to assure that the exact control point is reached. If as in FIG. 3 a ball consumption rate of 1.0 lb./ton of rock ground is chosen as the control point, the corresponding acidic slurry pH would be 5.0 and the corresponding acidic slurry particulate iron concentration would be 0.81 lbs. iron per ton of rock contained in the slurry. After the particulate iron control point is reached, periodic particulate iron tests and pH readings are performed for control purposes.

The preferred embodiment of this invention involves a method of maintaining the particulate iron concentration by recycling the endogenous particulate iron formed from the grinding balls in the ball mill. It also controls the pH of the slurry by mixing service water with pond water. An alternative embodiment of this invention can include the use of exogenous particulate iron added to the slurry to control ball consumption. This invention is equally useful in controlling and monitoring ball consumption in a grinding mill operation that chemically neutralizes pond water. Chemical neutralization of the pond water can take place with or without blending pond water and service water together. With chemical neutralization ammonia, soda, or another agent is used to neutralize in part or in whole the pond water used in the slurry.

Measurements of pH can be used alone with some certainty to adjust the pond water and service water ratio to obtain the ball consumption control point in a mill, but particulate iron measurements provide an essential means of assuring that the control point has been reached and that sufficient particulate iron is available in the slurry for corrosion protection. Factors such as rainfall, acid spills or changes in phosphate rock impurities can, on occasion, change the corrosivity of pond water without an exact proportional change in pH. The presence of the proper concentration of sacrificial particulate iron in the acidic slurry assures that corrosion remained controlled when fluctuations in slurry pH occur.

The control curves of different wet process phosphoric acid plants will usually not be identical to those illustrated due to variations in grinding mill type and size, phosphate rock hardness and impurity content, pond water characteristics and other factors. The control curves, however are similar for different plants. In full scale operations it has been found that operating at a range, where a minimum of 30% and preferably 50% of the particulate iron produced by ball erosion is maintained as particulate iron (i.e. not reacted with acid), is particularly ideal for plant conditions. These percentile figures are equivalent to particulate iron concentrations in the acidic slurry of a minimum of about 0.40 and preferably about 0.67 lbs. per ton of rock contained in the slurry.

In addition to providing acid-neutralizing capability, particulate iron via its reaction with acid provides the ingredients for the formation of a protective film on mill surfaces. This protective iron phosphate film forms on the iron or steel surfaces at pH values above 2.0. This corrosion-resistant film can be identical, or at least very similar to, the iron phosphate film designated as $FeHPO_4$. This formula represents one of several metal phosphate films which are known to form during industrial phosphating operations. The industrial phosphating operations are commonly used to treat metals for corrosion protection or for forming a base for application of organic top coatings. The formation of the film in ball mills can be verified by visual inspection. It can also be verified by immersion of clean steel immersion probes of instantaneous corrosion rate monitoring instruments into the ball mill slurry. One such instrument is the Magna Corrator, Model 1172. These instruments provide instantaneous corrosion rate data which can be read directly from the instrument face in actual corrosion rate units (mils per year). These instruments utilize an electrochemical phenomenon known as linear polarization in their operation. The technique involves measuring the current required to change the electrical potential of a specimen corroding in a conductive fluid by a few millivolts. The amount of applied current necessary to effect the potential change is proportional to the corrosion current. The instrument when used to verify the formation of a film does so by showing a steady decrease in the corrosion rate as the protective iron phosphate coating forms on the clean probe of the instrument.

In the typical commercial operation of a full scale plant, the ball mill would be running continuously. Therefore, the iron phosphate film would be forming continuously. Thus, film-forming substance would be available to repair any break of discontinuity in the film formed during prior operation of the ball mill. Thus, the film once formed is for all practical purposes permanent.

Our tests for particulate iron concentration were made using a high intensity, magnetic separator (Eric Mfg. Co., Model E.D.T., Style 8-5-0) to remove particulate iron from the slurry so that its weight could be determined.

Ball consumption rates in our laboratory and pilot plant tests were determined by simply weighing the balls before and after tests. Ball consumption rates in full scale plant operations were determined in long term tests by measuring ball additions to the ball mills. The ball level in mills is kept constant. In short term tests during which no balls were added, the ball consumption rate was determined by measuring the drop in ball level over the test period.

The pH measurements were made using a Beckman Chem-mate No. 72003 meter with corresponding combination pH electrodes, however, pH measurement is very common in industry and there is considerable equipment available that gives accurate results.

It was found that ball erosion rates in semi-pilot plant ball mills did not equal those in full scale plant mills due to the different ball drop distance. In some tests using the small mills to simulate full scale mills, silicon dioxide was added to the mill at the rate of 100 grams per 550 grams of rock feed. The silicon dioxide material increased the ball erosion rate of the small mills to equal that of the large mills.

The following examples are presented without limitation to the particular operation defined, but to further explain the specific embodiments.

EXAMPLE I

A small ceramic roller-type jar mill (manufactured by Norton Co., Curtin Matheson Scientific Inc. Catalog No. 072-496) and mill jar (manufactured by Norton Co., type 774) loaded with mild steel balls was used to wet batch grind 700 grams of raw phosphate rock. Then 400 milliliters of pond water with a pH of 1.74 was utilized to slurry the phosphate rock for the wet grinding. Some rise in pH is due to neutralization of acid by impurities in the rock and the remainder is from neutralization by particulate iron. The slurry pH during the wet grinding was as shown below in Table 1.

TABLE 1

| Time (minutes) | pH | Time (minutes) | pH |
|---|---|---|---|
| 0 | 1.75 | 26 | 4.75 |
| 5 | 3.42 | 33 | 4.71 |
| 12 | 3.75 | 40 | 5.04 |
| 19 | 4.63 | 47 | 5.20 |

Note:
The mill was stopped for approximately two minutes during each pH reading.

COMPARATIVE EXAMPLE I

The same ball mill used in Example I, above, was loaded with ceramic balls. Again, 700 grams of raw phosphate rock was slurried with 400 mls of pond water, pH 1.74. The pH readings during the grinding operation were as follows:

TABLE 2

| Time (minutes) | pH | Time (minutes) | pH |
|---|---|---|---|
| 0 | 1.74 | 33 | 3.32 |
| 5 | 2.48 | 40 | 3.61 |
| 12 | 2.75 | 47 | 3.82 |
| 19 | 2.89 | 54 | 4.02 |
| 26 | 3.10 | 66 | 4.21 |

Note:
The mill was stopped for approximately two minutes during each pH reading.

As is obvious by comparing Table 1 and Table 2 data, the pH rise is remarkably higher when metal balls are used. This shows that the acid is being consumed at a much faster rate through the interaction with the erosion products of the steel balls.

EXAMPLE II

The small ceramic ball mill grinder of Example I was again used. Four tests were run with each using 650 grams of raw phosphate rock of less than 4 mesh size and 350 ml. of service water or gypsum pond water. A 23 lb. charge of one inch diameter steel balls was used in each test. The grinding time in each test lasted about 30 minutes. In two of the tests, one conducted with service water, one conducted with pond water, 100 grams of silicon carbide was used to increase the erosion rate of approximately the same erosion rate experienced in full scale phosphate rock ball grinding mills. In the other two tests, one conducted with service water and one conducted with pond water, no silicon carbide was used.

The two tests without silicon carbide addition show that grinding with pond water results in almost a three fold increase in ball consumption rate over the rate experienced when grinding with service water. This is an incomplete picture of the process, however, since the low erosion rates of the small laboratory mill distorts the relative ball consumption rates. The two tests with silicon carbide addition give a more correct picture of the process since the grinding rate is equivalent to full scale operations. In the tests using silicon carbide, ball consumption rates in grinding operations utilizing pond water were only about 25% higher than in grinding operations using service water.

This example shows that the rock grinding rate (and ball erosion rate) is critical to the proper operation of the invented process. A higher rock grinding rate exposes more surface area of the phosphate rock to the acidic slurry and produces more high-surface area particulate iron for reaction with the pond water.

The results of the tests are shown in Table 3 below:

TABLE 3

Effects of Changes in Grinding Rate on Ball Consumption

| Aqueous phase | pH | Ball Consumption (% weight) | |
|---|---|---|---|
| | | Without Silicon Carbide | With Silicon Carbide |
| service Water | 7.7 | 1.35 | 3.6 |
| Pond Water | 3.5 | 3.6 | 4.5 |

EXAMPLE III

This example was a test run carried out at Freeport Minerals Company's phosphoric acid plant located at Uncle Sam, La. The ball mills are Hardinge cylindrical ball mills, 2500 h.p., size 15½' diameter×15' cylinder length. The raw phosphate rock fed to the ball mill contained 10–12% moisture. A recycle system consisting of an arrangement of piping, storage tanks, and pumps allowed oversize product from the mill to be recycled back to the mill to simulate the usual practice of wet process plants. The recycle rate to the mill was maintained at about 125% of the raw rock feed to the mill. Other parameters of the grinding operation are shown in Table 4 below:

TABLE 4

| Rock Rate (t/hr) | River Water (GPM) | Pond Water (GPM) | pH Average | | Ball Consumption lb./ton rock |
|---|---|---|---|---|---|
| | | | Ball Mill Feed | Cyclone Discharge fines | |
| 217 | 193 | 59 | 4.1 | 5.7 | .76 |

Historical data on the ball mill for the calendar year prior to the four month test period involved in this example shows a ball consumption rate of 0.54 lbs. (of balls)/tons (phosphate rock) at an average rock feed rate of 172 TPH and the exclusive use of Mississippi River water as a slurry liquid. The ball consumption increase of about 40% when using acidic pond water instead of only Mississippi River water, while appreciable, was considered acceptable in view of the cost savings due to the use of pond water.

The periodic determination of particulate iron concentration in the rock slurry and its correlation to the control curves allows the mill operators to immediately determine a value of ball consumption for the mill. The mill operators can then, if necessary, take corrective measures to balance the amount of ball corrosion with the amount of pond water usage to permit economical operation of the mill.

While certain preferred embodiments of the present invention have been disclosed in detail, it is to be understood that various modifications in its structure and method may be adopted without departing from the spirit of the invention or the scope of the following claims. In describing the preferred embodiment of the invention specific terminology was resorted to for the sake of clarity. However, it is not intended that the invention be limited to the specific terms so selected and it is to be understood that each specific term includes all technical equivalents which operate in a similar manner to accomplish a similar purpose.

We claim:

1. A method for grinding phosphate rock with mild steel grinding balls in an acidic slurry comprising:
    (a) establishing control curves relating three variables of said slurry, said variables being:
        (i) pH;
        (ii) particulate iron content; and
        (iii) ball consumption;
    (b) determining particulate iron content in said slurry after a period of operation of said mill;
    (c) correlating said particulate iron content to said control curve; and
    (d) adjusting said slurry variables of pH by altering a blend of low pH pond water and a substantially neutral pH service water togehter which form an aqueous phase of the acidic slurry, and particulate iron content to an extent required to produce a predetermined ball consumption rate.

2. A method according to claim 1 wherein said pond water and said service water blend is of a pH less than 4.0.

3. A method according to claim 1 wherein said service water is of a pH between 6.0 and 8.0.

4. A method according to claim 1 wherein said particulate iron content of the acidic slurry is greater than 0.40 pounds of iron particles to a ton of phosphate rock contained in the slurry.

5. A method according to claim 1 wherein a percentage of particulate iron maintained in the acidic slurry is at least 30% of the particulate iron produced by grinding ball erosion.

6. A method according to claim 1 wherein the mill grinding balls are constructed of forged steel.

7. A method according to claim 1 wherein the mill grinding balls are constructed of iron.

8. A method for grinding phosphate rock utilizing an acidic pond water comprising the steps of:
    (a) blending an acidic pond water and a service water together;
    (b) feeding said blended pond water and service water and a quantity of phosphate rock into a ball mill to form a slurry;
    (c) grinding said phosphate rock slurry in said ball mill, said ball mill having, a plurality of iron containing grinding balls which erode to form iron particles within said slurry;
    (d) recycling at least a portion of said iron particles to maintain an iron particulate concentration within said slurry sufficient to retard corrosion of said grinding balls by said acidic pond water;
    (e) monitoring said particulate iron concentration in said phosphate rock slurry;
    (f) correlating said monitored particulate iron concentrations to control curves that relate slurry particulate iron concentration values to slurry pH and slurry pH to grinding ball consumption values; and
    (g) regulating (i) said blend of acidic pond water and service water to control slurry pH and (ii) said slurry particulate iron concentration to maintain these values within desired ranges of said control curves.

9. The method of claim 8 wherein a pH of said acidic pond water and said service water blend is less than 4.0.

10. A method according to claim 8 wherein said concentration of said acidic pond water is regulated by dilution with a service water.

11. The method of claim 10 wherein the pH of said service water is between 6.0 and 8.0.

12. A method according to claim 8 wherein said iron particulate concentration is equilibrated by addition of an exogenous iron particulate matter.

13. A method according to claim 8 wherein said particulate iron concentration within said slurry is greater than 0.40 pounds of iron particles to a ton of phosphate rock contained in the slurry.

14. A method according to claim 8 wherein said particulate iron concentration is maintained in said slurry in an amount of at least 30% of the particulate iron produced by grinding ball erosion.

15. A method according to claim 8 wherein said mill grinding balls are constructed of forged steel.

16. A method according to claim 8 wherein said mill grinding balls are constructed of iron.

* * * * *